3,103,514
ORGANOBORON POLYMERS AND THEIR PREPARATION

Allen L. McCloskey, Orange, Robert J. Brotherton, Fullerton, and Lowell L. Petterson, Whittier, Calif., assignors to United States Borax & Chemical Corporation, Los Angeles, Calif., a corporation of Nevada
No Drawing. Filed Apr. 5, 1962, Ser. No. 185,203
2 Claims. (Cl. 260—289)

The present application is a continuation-in-part of application, Serial No. 116,954, dated June 14, 1961, now abandoned, which is a division of our parent application bearing Serial No. 808,907, filed April 27, 1959 now Patent 3,062,823, issued November 6, 1962.

This invention relates as indicated to the preparation of organoboron compounds and has more particular reference to the production of organoboron compounds having boron-boron bonds.

The syntheses of organic compounds having boron-boron bonds have in the past been costly, slow and particularly have resulted in low yields and in questionable end products.

It is therefore the principal object of this invention to provide a new method for producing boron-boron systems.

A further object is to provide a method for producing diboron materials which is economical, efficient and results in high yields.

A still further object is to provide a method for making tetraalkoxydiborons, tetraaryloxydiborons and polymers from such materials.

Other objects will appear as the description proceeds.

To the accomplishment of the foregoing and related ends, the invention then comprises the features hereinafter fully described and pointed out in the claims, the following description setting forth in detail certain illustrative embodiments of the invention, these being indicative, however, of but a few of the ways in which the principle of the invention may be employed.

Broadly stated, the present invention comprises the method of producing compounds having boron-boron bonds according to the general reaction:

$$B_2(NR_2)_4 + 4R'OH \rightarrow B_2(OR')_4 + 4R_2NH$$

wherein $B_2(NR_2)_4$ is a material selected from the class consisting of tetraalkylaminodiborons and tetraarylaminodiborons derived from primary and secondary amines, R'OH is a material selected from the class consisting of alcohols, phenols and 8-hydroxyquinoline and said reactants are present in substantially stoichiometric amounts.

Referring to the tetraalkylaminodiborons and tetraarylaminodiborons in the above broadly stated paragraph, the amino groups can be derived from primary and secondary aliphatic or aromatic amines. The following list is a partial enumeration of such materials which are applicable to this invention:

Tetra(methylamino)diboron
Tetra(ethylamino)diboron
Tetra(isopropylamino)diboron
Tetra(n-hexylamino)diboron
Tetra(dimethylamino)diboron
Tetra(diethylamino)diboron
Tetra(diisopropylamino)diboron
Tetra(di-n-hexylamino)diboron
Tetra(anilino)diboron
Tetra(p-toluidino)diboron
Tetra(1-naphthylamino)diboron
Tetra(diphenylamino)diboron In the preferred embodiment of our invention, became of cost and availability we use tetraalkylaminodiborons, the amino group of which is derived from secondary alkyl amines wherein the alkyl groups have from 1–6 carbon atoms.

As for the other reactant in the above broadly stated paragraph, this can be any primary, secondary or tertiary alcohol, phenol or 8-hydroxyquinoline. It is to be understood that phenol as used in the present invention is meant to include condensed ring phenols as well as mononuclear phenols. Thus the following list illustrates various compounds applicable to the present invention.

Alcohols:
    Methanol
    Ethanol
    n-Propyl alcohol
    Isopropyl alcohol
    n-Butyl alcohol
    Isobutyl alcohol
    Sec-butyl alcohol
    Tert-butyl alcohol
    All pentyl alcohols
    All hexyl alcohols
    All heptyl alcohols
    All octyl alcohols Phenols:
    Phenol
    Cresols
    Xylenols
    Mesitol
    Catechol
    α-Naphthol
    8-hydroxyquinoline We have found that the yields obtained from the foregoing disclosed general reaction can be greatly increased, the reactions can be brought to completion in much shorter time, and the reactions can be conducted at substantially lower temperatures by the addition of an anhydrous hydrogen halide, such as HCl, HBr or HF. We have found that the addition of one of the foregoing anhydrous hydrogen halides weakens the bond between boron and nitrogen and thus makes it easier for the hydroxyl radical to replace the amine radical. This reaction can be illustrated as follows:

$$B_2(NR_2)_4 + 4R'OH + 4HX \rightarrow B_2(OR')_4 + 4R_2NH \cdot HX$$

wherein $B_2(NR_2)_4$ and R'OH are as defined above and HX is an anhydrous hydrogen halide selected from the group consisting of HCl, HBr and HF.

It is important at this point to also note the fact that the present reactants are used in substantially stoichiometric amounts. By this we mean that while the exact molar ratios do not have to be maintained, only a slight excess or slight deficiency of any of the ingredients should be used. An excess of alcohol, etc., or hydrogen halide will cause cleavage of the boron-boron bond, and the greater the excess the greater is the cleavage and consequent lowering of the yield of the desired product. Conversely, a deficiency of the correct amount of ingredients results in the reaction not going to completion. Thus in the preferred embodiment of our invention we use substantially one mole of $B_2(NR_2)_4$ to substantially 4 moles of R'OH and 4 moles of HX.

The diboron compounds of the present invention $[(RO)_4B_2]$ when heated will produce boron-boron bonded polymeric materials wherein the recurring unit is $(BR)_x$, where R is a radical selected from the group consisting of alkoxy, phenoxy and quinolin-8-oxy, and $x$ is an integer of at least 5. The formation of these polymeric materials can best be illustrated as follow:

$$(RO)_4B_2 \xrightarrow{\Delta} B(OR)_3 + (BOR)_x$$

The number of boron-boron linkages in these polymers is dependent upon the length of time the material is heated and the temperature at which the polymerization reaction is performed. The least number of boron-boron linkages in polymers produced by this method is 5, while with continued heating or heating at higher temperatures it is possible to prepare polymers which are of much higher molecular weight.

So that the present invention can be more clearly understood, the following examples are given:

(I)

Tetra(dimethylamino)diboron, 4.27 g. (21.6 mmoles) was added to a solution of 3.97 g. (86.4 mmoles) of absolute ethanol in 25 ml. of hexane. The reaction mixture was warmed to 40–50° C. with vigorous stirring and the resulting dimethylamine was swept into a solution of 0.5 N hydrochloric acid with a dry nitrogen stream. When substantially all of the dimethylamine was evolved (about 135 hours) and recovered, the hexane was removed by distillation at reduced pressure. The residue was then distilled rapidly at about 43–53° C./2 mm.

The distillate obtained comprising an admixture of ethyl borate and tetraethoxydiboron was then slowly vacuum fractionated at room temperature and $10^{-6}$ mm. to give pure tetraethoxydiboron, having a B.P. 20–21° C./0.1–0.2 mm., $n_D^{24}$=1.3960.

Analysis.—Calculated for $B_2(OEt)_4$: B, 10.70%; C, 47.60%; H, 9.99%. Found: B, 10.50%; C, 47.56%; H, 9.91%.

A cryoscopic molecular weight determination in benzene in a dry nitrogen atmosphere gave a molecular weight substantially the same as the calculated molecular weight, 201.7.

(II)

Tetra(dimethylamino)diboron, 4.2058 g. (21.27 mmoles) was cooled to −80° C. and 5 ml. (85.8 mmoles) of ethanol was added. To this mixture was added with vigorous stirring 29.8 ml. (85.08 mmoles) of a previously prepared solution of hydrogen chloride in diethyl ether. The stirring was continued for about one hour. The mixture was slowly warmed to 0° C. and stirred for about another hour, at which time the reaction mass was filtered. Substantially all of the dimethylamine was precipitated as dimethylamine hydrochloride at the end of this time. Attention is directed to Example I where it took about 135 hours to evolve the dimethylamine, whereas the presence of the HCl in the present example caused the dimethylamine to substantially completely precipitate as its hydrochloride in about one hour at 0° C.

The pure tertaethoxydiboron was obtained by vacuum fractionation (of the filtrate) as in Example I.

A portion of tetraethoxydiboron was placed in a closed system under a nitrogen atmosphere. The material was heated at a temperature of about 130° C. for a period of about 4.5 hours. The volatile reaction products were then removed from the system and a yellow-brown resinous solid was recovered from the reaction vessel. Chemical analysis of the product yielded the following data.

Calculated for $(BOC_2H_5)_x$: B=19.36%, H=9.02%. Found in product: B=19.01%, H=8.69%.

(III)

The reaction of terta(dimethylamino)diboron with methanol in a 1 to 4 molar ratio was carried out as described above in the presence of 4 moles of anhydrous hydrogen bromide. The reaction mass was maintained at −80° C. for one hour and the resulting solid was filtered. The filtrate was distilled as above in Examples I and II. The resultant product was substantially pure tetramethoxy-diboron.

A portion of tetramethoxydiboron was placed in a closed system under a nitrogen atmosphere. The material was then heated at from about 132° C. to about 139° C. for a period of about 22 hours. The volatile reaction products were then removed from the system and a brown resinous powder was recovered from the reaction vessel. Chemical analysis of the polymeric product yielded the following data.

Calculated for $(BOCH_3)_x$: B=25.85%, H=7.22%. Found in product: B=25.26%, H=7.05%.

IV

A diethyl ether solution of 4.00 g. (20.21 mmoles) of tetra(dimethylamino)diboron and 4.85 g. (80.84 mmoles) of isopropyl alcohol was cooled to −85° C. and 80.84 mmoles of anhydrous hydrogen chloride in 37.6 ml. of diethyl ether solution was added over a 15-minute period. Solids formed and the resulting slurry was stirred for about another 45 minutes. The mixture was warmed to 0° C., stirred for about an hour, and the solids were then removed by filtration. The solvent was removed from the filtrate by rapid distillation at 2 mm. to give a 71.6% yield of residual tetraisopropoxydiboron, $n_D^{25}$ 1.3970.

Analysis.—Calculated for $C_{12}H_{28}O_4B_2$: B, 8.39%; mol. wt., 258.0. Found: B, 8.22%; mol. wt. 261.5.

A portion of tetraisopropoxydiboron was placed in a closed system under a helium atmosphere and was heated at about 155° C. for a period of about 8 hours. The volatile reaction products were then removed from the system and an off-white resinous powder was recovered from the reaction vessel. Chemical analysis of the polymeric product yielded the following data:

Calculated for $(BOC_3H_7)_x$: B=15.48%, H=10.10%. Found in product: B=15.21%, H=9.73%.

(V)

A solution of 0.46 g. (2.32 mmoles) of tetra(dimethylamino)diboron and 1.35 g. (9.31 mmoles) of 8-hydroxyquinoline in 30 ml. of benzene was heated to 75–80° C. The resulting dimethylamine was swept into standard HCl with a stream of dry nitrogen. About 93% of the theoretical amine was removed in about 6 hours, and during this time the reaction mass changed from a yellow solution to an orange-brown solid-liquid mixture. The mixture was cooled and filtered. The resultant orange solid on analysis proved to be tetra(quinolin-8-oxy) diboron, $C_{36}H_{24}O_4N_4B_2$.

VI

A solution of 6.14 g. (63.0 mmoles) of phenol and 3.23 g. (16.0 mmoles) of tetra(dimethylamino)diboron in 75 ml. of toluene was heated to 100° C. and the resulting dimethylamine was swept into standard HCl with a stream of dry nitrogen. Substantially all of the dimethylamine was evolved after about 6 hours. The solvent was distilled under vacuum leaving a brownish oil. Treatment of the brown oil with petroleum ether (B.P. 20–40° C.) resulted in tetraphenoxydiboron.

A portion of the tetraphenoxydiboron was placed in a 100 ml. round-bottomed flask equipped with a short reflux condenser. The material was heated at about 190° C. for a period of about 10 hours at which time a clear solution remained in the flask. About 50 ml. of n-pentane was added to the flask and solids precipitated from the solution. The reaction mass was then filtered and the off-white resinous product was recovered and dried in a vacuum oven. Analysis of the polymeric product showed that it contained about 12 boron-boron linkages.

From the foregoing it will be seen that we have provided a method for the preparation of organoboron compounds having boron-boron bonds and which compounds can be disproportionated to produce polymeric boranes. The tetraalkoxydiborons and tetraaryloxydiborons additionally will be found to have use as herbicides and intermediates in chemical syntheses.

Compounds containing boron-boron bonds are known to have reducing properties. The polymers of the present invention containing a multiplicity of such boron-boron bonds have been found to be extremely potent reducing agents and have utility as reducing agents in numerous chemical reactions and in a variety of chemical processes, such as chemical plating.

Other modes of applying the principle of the invention may be employed, change being made as regards the details described, provided the features stated in any of the following claims or the equivalent of such be employed.

We, therefore, particularly point out and distinctly claim as our invention:

1. The method of producing polymeric materials having at least five boron-boron linkages wherein the recurring monomeric units is $(BR)_x$ which comprises disproportionating with heat a diboron compound which has the formula $B_2R'_4$, where R and R' are selected from the group consisting of alkoxy of from 1–8 carbon atoms, phenoxy and quinolin-8-oxy and $x$ is an integer of at least 5.

2. A polymeric material having at least five boron-boron linkages and wherein the recurring monomeric unit is $(BR)_x$, R is selected from the group consisting of alkoxy of from 1–8 carbon atoms, phenoxy and quinolin-8-oxy and $x$ is an integer of at least 5.

No references cited.